(12) United States Patent
Gotoh (10) Patent No.: US 8,547,808 B2
(45) Date of Patent: Oct. 1, 2013

(54) OPTICAL PICKUP ACTUATOR AND OPTICAL DISC DRIVER USING THE SAME

(75) Inventor: Hideru Gotoh, Fukuoka (JP)

(73) Assignee: Panasonic Corporation, Osaka (JP)

( * ) Notice: Subject to any disclaimer, the term of this patent is extended or adjusted under 35 U.S.C. 154(b) by 258 days.

(21) Appl. No.: 12/578,519

(22) Filed: Oct. 13, 2009

(65) Prior Publication Data

US 2010/0097920 A1   Apr. 22, 2010

(30) Foreign Application Priority Data

Oct. 16, 2008  (JP) .................................. 2008-267009

(51) Int. Cl.
*G11B 7/00* (2006.01)

(52) U.S. Cl.
USPC ...................................................... 369/44.14

(58) Field of Classification Search
None
See application file for complete search history.

(56) References Cited

U.S. PATENT DOCUMENTS

| | | | |
|---|---|---|---|
| 6,781,946 B2 * | 8/2004 | Murata et al. | 369/112.23 |
| 7,979,874 B2 * | 7/2011 | Park et al. | 720/714 |
| 2006/0077781 A1 | 4/2006 | Yamada | |
| 2006/0206907 A1 * | 9/2006 | Sekita | 720/643 |
| 2007/0091739 A1 | 4/2007 | Aso | |

FOREIGN PATENT DOCUMENTS

| | | |
|---|---|---|
| JP | 2002-334459 | 11/2002 |
| JP | 2006-018978 | 1/2006 |
| JP | 2006-066016 | 3/2006 |
| JP | 2006-196053 | 7/2006 |
| JP | 2007-115358 | 5/2007 |
| JP | 2008-065889 | 3/2008 |

OTHER PUBLICATIONS

Japanese Office Action dated Apr. 12, 2010 with English translation.

* cited by examiner

*Primary Examiner* — Joseph Feild
*Assistant Examiner* — Parul Gupta
(74) *Attorney, Agent, or Firm* — Dickinson Wright PLLC (57) ABSTRACT

The present invention relates to an optical pickup actuator which includes a plurality of objective lenses for converging a light on an optical recording medium, a lens holder for holding the objective lenses, a suspension wire for holding the lens holder and projections provided at the lens holder, wherein the projections are provided at the periphery of the objective lens and at least one of the projections is provided on the upstream side of the insertion direction of the optical recording medium. A slope for guiding the optical recording medium upward at the time of inserting the optical recording medium is provided on the side surface of each of the projections. Thus, even when the optical recording medium is inserted so as to slide on the upper surface of a pickup cover, the end portion of the outer periphery of the optical recording medium contacts with the slope provided at the projection and slides to thereby push down the optical pickup actuator in the elevational direction. Thus, since there does not arise a force in the bending direction of the suspension wire, the deformation of the suspension wires can be prevented.

13 Claims, 5 Drawing Sheets

OPTICAL PICKUP ACTUATOR AND OPTICAL DISC DRIVER USING THE SAME

BACKGROUND

1. Field of the Invention

The present invention relates to an optical pickup actuator for reproducing and recording information with respect to an optical disc such as a BD (blue-ray disc) as well as a CD or a DVD as known information recording medium and also relates to an optical disc driver using the optical pickup actuator.

2. Description of the Related Art

The optical discs include three kinds of discs of CD, DVD and BD. In a view point of convenience of a user, an optical disc driver has been required is to perform at least recording or reproducing as to these three kinds of discs (see JP-A-2007-115358).

Among the optical disc drivers capable of coping with such many kinds of optical discs, there is a type which is configured to protrude the part of the movable portion of an optical pickup actuator from a pickup cover, in order to minimize the moving distance of the optical pickup actuator even in the disc at the time of recording or reproducing information with respect to a CD, a DVD or a BD. This reason will be explained later.

However, in an optical pickup device configured in this manner, since the part of the movable portion of the optical pickup actuator is configured to protrude from the pickup cover, an optical disc contacts with a lens protector to thereby apply an external force thereto when the optical disc is inserted so as to slide on the upper surface of the pickup cover. When an external force is applied to the lens protector, since a force is applied to a suspension wire in the bending direction thereof, there may arise a deformation such as a bent or a warp in the suspension wire. When the suspension wire deforms, since the optical pickup actuator is suspended by six suspension wires, the optical pickup actuator tilts to thereby shift an objective lens. Thus, since the objective lens inclines from the optical axis, a laser light cannot be converged vertically with respect to a recording surface of the disc. As a result, there arises a problem that the recording and reproducing characteristics with respect to the optical disc degrades and the recording and reproducing operations may be impossible.

SUMMARY

The invention is made in view of the aforesaid problem of the related art, and an object of the invention is to provide an optical pickup actuator which is configured in a manner that, even when an optical recording medium is inserted so as to slide on the upper surface of a pickup cover, the outer peripheral end portion of the optical recording medium contacts with an inclination added to a projection and slides along the inclination to push down the optical pickup actuator in the elevational direction, whereby no force is generated in the bending direction of suspension wires and so the deformation of the suspension wires can be prevented.

In order to attain the aforesaid object, the invention provides an optical pickup actuator which includes a plurality of objective lenses for converging a light on an optical recording medium, a lens holder for holding the objective lenses, suspension wires for holding the lens holder and projections provided at the lens holder, wherein the projections are provided at the periphery of the objective lens and at least one of the projections is provided on the upstream side of the insertion direction of the optical recording medium. A slope for guiding the optical recording medium upward at the time of inserting the optical recording medium is provided on the side surface of each of the projections.

Another object of the invention is to provide the optical disc driver in which even when the optical recording medium is inserted so as to slide on the upper surface of the pickup cover, the end portion of the outer periphery of the optical recording medium contacts with the slope provided at the projection and slides along the slope to thereby push down the optical pickup actuator in the elevational direction, whereby there does not arise a force in the bending direction of the suspension wires and so the deformation of the suspension wires can be prevented.

Still another object of the invention is to provide the optical pickup actuator that can surely contact the optical recording medium with the slope when the optical recording medium is inserted so as to slide on the upper surface of the pickup cover.

Still another object of the invention is to provide the optical disc driver which can surely contact the optical recording medium with the slope when the optical recording medium is inserted so as to slide on the upper surface of the pickup cover.

Still another object of the invention is to provide the optical pickup actuator that can surely contact the optical recording medium with the slope even when the optical recording medium is inserted from any direction so as to slide on the upper surface of the pickup cover.

Still another object of the invention is to provide the optical disc driver that can surely contact the optical recording medium with the slope even when the optical recording medium is inserted from any direction so as to slide on the upper surface of the pickup cover.

Still another object of the invention is to provide the optical pickup actuator in which there does not arise a force in the bending direction of the suspension wires, and hence the deformation of the suspension wires can be prevented.

Still another object of the invention is to provide the optical disc driver in which there does not arise a force in the bending direction of the suspension wires, and hence the deformation of the suspension wires can be prevented.

BRIEF DESCRIPTION OF THE DRAWINGS

FIG. 6(*a*) is a diagram for explaining the operation in the case where the end portion of the outer periphery of an optical disc contacts with a lens protector, in the actuator of the related art.

FIG. 6(*b*) is a diagram for explaining the operation in the case where the end portion of the outer periphery of an optical disc contacts with a slope added to the lens protector according to the embodiment of the invention.

DETAILED DESCRIPTION

Hereinafter, a disc driver according to an embodiment of the invention will be explained.

Figure 1:
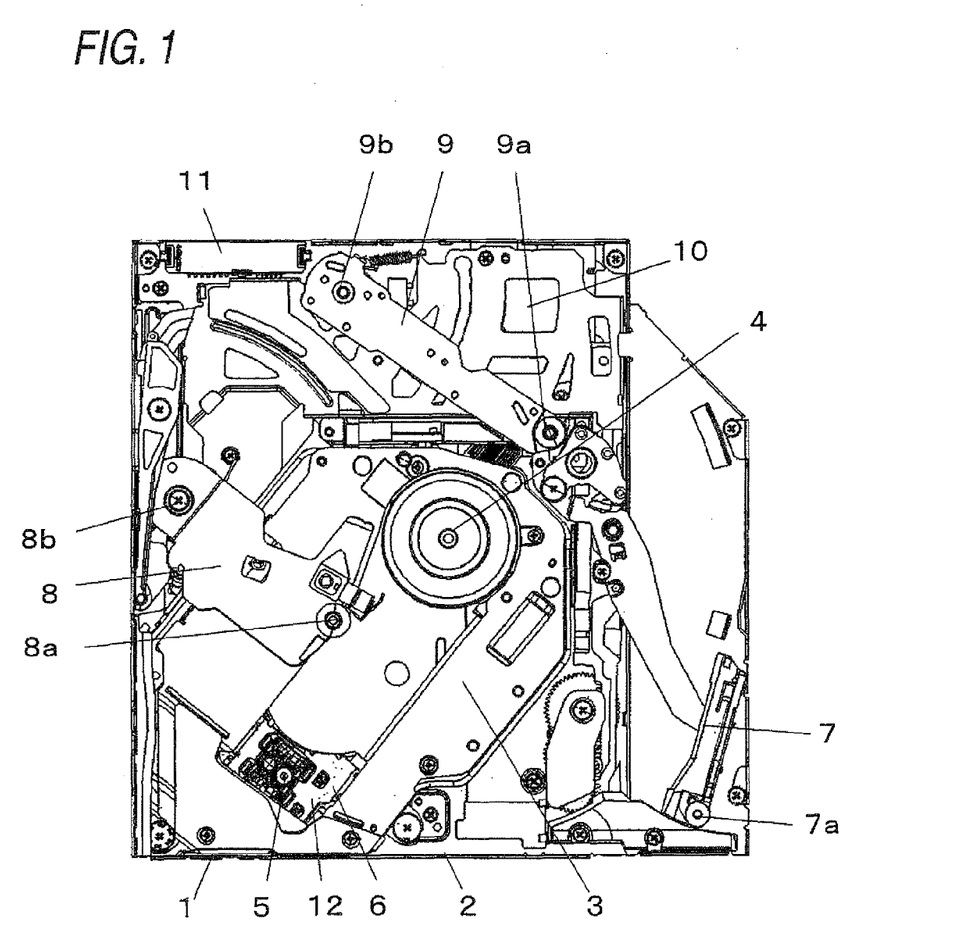
FIG. 1 is a plan view of the optical disc driver according to an embodiment of the invention.

FIG. 1 is a plan view of the base main body of the optical disc driver according to the embodiment.

As shown in FIG. 1, respective parts for performing a recording/reproducing function and a loading function for an optical disc are attached to the base is main body 1. A disc insertion port 2 for directly inserting an optical disc therein is formed on the front surface side of the base main body 1. A traverse mechanism 3 is disposed on the disc insertion port 2 side of the base main body.

The traverse mechanism 3 holds a spindle motor 4, an optical pickup actuator 5, an optical pickup 6 etc. The spindle motor 4 rotates an optical disc. The optical pickup actuator 5 is provided on the one end side of the traverse mechanism 3 so as to be movable from the one end side to the other end side of the traverse mechanism 3. The optical pickup actuator 5 is disposed at the other end side of the traverse mechanism 3 at the time of stopping. The optical pickup 6 acts as a light source and a light receiving portion of a laser light for recording information into and reproducing information from an optical disc. The optical pickup includes the optical pickup actuator 5.

The traverse mechanism 3 is arranged in a manner that the spindle motor 4 locates at the center portion of the base main body 1, the reciprocal movement range of the optical pickup actuator 5 locates on the disc insertion port 2 side than the position of the spindle motor 4, and the reciprocal movement direction of the optical pickup actuator 5 differs from the insertion direction of a disc.

Next, the explanation will be made as to a guide member for supporting an optical disc at the time of inserting the optical disc and a lever member that operates at the time of inserting an optical disc.

A reference numeral 7 depicts a drawing lever for transferring an optical disc at the time of inserting the optical disc. The drawing lever is provided within the base main body 1 of the disc insertion port 2 and a disc guide 7a is provided at the movable side end portion of the drawing lever 7.

The disc guide 7a is configured by a cylindrical roller and provided so as to be rotatable freely at the movable side end portion of the drawing lever 7. A groove is formed at the outer periphery of the disc guide 7a so as to support an optical disc by the groove. The drawing lever 7 is disposed in a manner that the movable side end portion thereof operates on the disc insertion port 2 side than a fixed side end portion thereof. A not-shown rotary fulcrum is provide at the fixed side end portion.

A reference numeral 8 depicts an ejection lever for transferring an optical disc at the time of ejecting the optical disc. The ejection lever is provided at a side portion of the base main body different from the portion where the drawing lever 7 is provided. A guide 8a is provided at the movable side end portion on the one end side of the ejection lever 8 so as to support an optical disc. A rotary fulcrum 8b is provided at the other end side of the ejection lever so that the ejection lever 8 swings around the rotary fulcrum 8b. A reference numeral 9 depicts a restriction lever for transferring an optical disc at the time of ejecting the optical disc. The restriction lever is provided on the rear surface side of the base main body 1. A guide 9a is provided at the movable side end portion of the restriction lever 9 so as to support an optical disc. The restriction lever 9 swings around the rear surface side end portion thereof that serves as a rotary fulcrum 9b.

A reference numeral 10 depicts a printed board. A reference numeral 11 depicts a connector for electrically coupling the printed board 10 with a control board provided at the optical disc driver. A reference numeral 12 depicts a pickup cover for protecting optical pickup parts such as the actuator.

Figure 2:
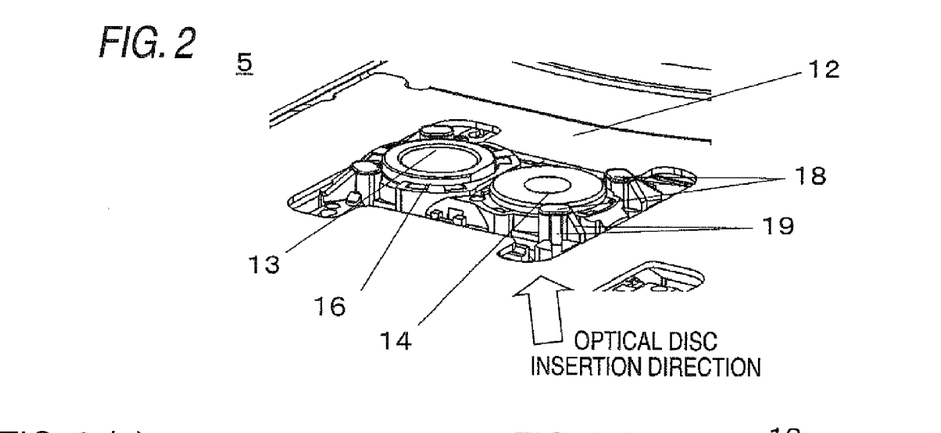
FIG. 2 is an enlarged perspective view of the actuator to be attached to the base main body according to the embodiment of the invention.
Figure 3:
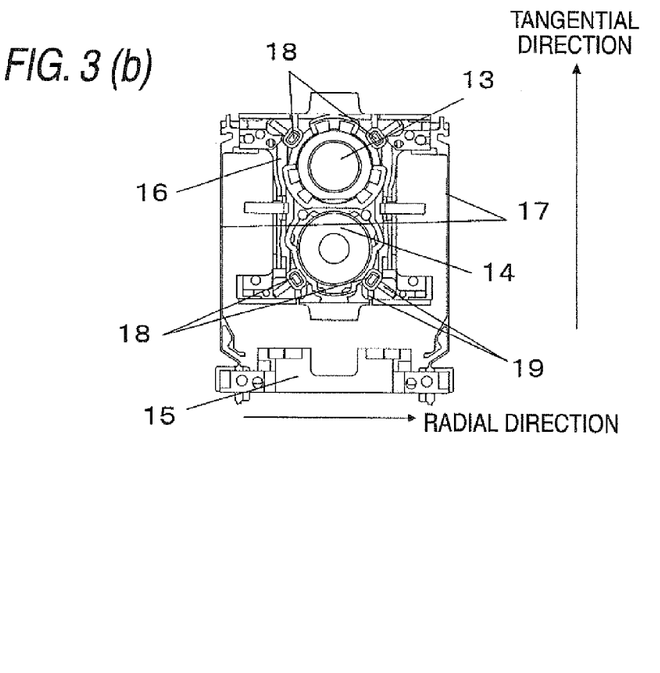
FIG. 3 shows a top view and a side view of the driving portion of the actuator according to the embodiment of the invention from which a fixed side magnet is removed

Next, the aforesaid optical pickup actuator 5 will be explained in detail. FIG. 2 is an enlarged perspective view of the optical pickup actuator to be attached to the base main body. FIG. 3(a) and FIG. 3(b) are a top view and a side view of the driving portion of the optical pickup actuator from which a fixed side magnet is removed, respectively.

A reference numeral 13 depicts an objective lens for a long wavelength laser that converges a light reflected from a raising mirror on an optical disc. In this embodiment, although the objective lens is used, another converging member such as a hologram may be used in place of the objective lens. As a matter of course, a light reflected from an optical disc passes the objective lens 13. The objective lens 13 is formed by material such as glass or resin.

A reference numeral 14 depicts an objective lens for a short wavelength laser that converges a light reflected from a raising mirror on an optical disc. In this embodiment, like the objective lens 13 for a long wavelength laser, although the objective lens is used, another converging member such as a hologram may be used in place of this objective lens. As a matter of course, a light reflected from an optical disc passes the objective lens 14. Although the objective lens 14 is formed by material such as glass or resin, the objective lens 14 is preferably formed by short-wavelength withstand optical resin (resin which hardly or does not deteriorate by a short-wavelength). In this embodiment, although the objective lens 14 for a short wavelength laser is disposed on a suspension holder 15 side, the position of the objective lens 13 for a long wavelength laser and the position of the objective lens 14 for a short wavelength laser may be changed.

A reference numeral 15 depicts the suspension holder. The suspension holder 15 is attached to a base via a yoke member by means of one of various kinds of joining methods.

A reference numeral 16 depicts a lens holder to which the objective lenses 13, 14, the optical parts, an achromatic diffraction lens etc. are attached. When the lens holder 16 moves, the objective lenses 13, 14 and the optical parts also move together with the lens holder 16.

A reference numeral 17 depicts suspension wires. The suspension holder 15 and the lens holder 16 are coupled via the suspension wires 17. The lens holder 16 is supported so as to be movable within a predetermined range with respect to the base. Since the lens holder 16 is suspended by the suspension holder 15, the lens holder is freely movable in a focus direction (left and right direction in FIG. 3(b)) and a tracking direction (elevational direction in FIG. 3(b)).

The suspension wires 17 are formed by three suspension wires and other three suspension wires respectively provided on one and the other side of the lens holder 16 in an opposed manner so as to sandwich the lens holder 16 therebetween. The suspension wires 17 elastically couple the suspension holder 15 and the lens holder 16, whereby at least the lens holder 16 is deformable with respect to the suspension holder 15 in a predetermined range. Although the six suspension wires 17 are provided in a manner that three suspension wires and other three suspension wires are provided in the opposed manner, the suspension wires 17 more than six (for example, eight) may be provided or the suspension wires 17 less than six (for example, four) may be provided. The both end portions of the suspension wires 17 fixed to the lens holder 16 and the suspension holder 15 by means of the insert molding etc., respectively.

A reference numeral 18 depicts lens protectors for protecting the objective lens in a manner that an optical disc does not directly contact with the objective lens in a case of sudden collision of the optical disc. A reference numeral 19 depicts slopes which are respectively provided at the side surfaces of the lens protectors 18 in a manner that each of the slopes extends from the highest position of the corresponding lens protector 18 with a slanted angle of 45 degree so as to extend to the lower position than the highest position of the pickup cover 12. This is because if the slopes 19 terminate at the position higher than the highest position of the pickup cover 12, the outer peripheral end portion of an optical disc may contact with a portion other than the slopes and so the sufficient effects of the slopes may not be obtained. When an optical disc is inserted so as to slide on the upper surface of the pickup cover 12, the slopes 19 act to push down the optical pickup actuator 5 in the elevational direction to thereby prevent the deformation of the suspension wires 17. In this embodiment, although the slanted angle of the slope 19 is set to 45 degree, the aforesaid effects can be enhanced when the slanted direction of the slope 19 is set so as to be closer to the horizontal line. Further, in this embodiment, although the slopes are formed by liquid crystal polymer, when the slopes is finished so as to have small surface roughness by polishing a mold or polishing the slopes 19 as an after treatment, since a friction force at the time of contact between an optical disc and the slopes 19 becomes small, sufficient effects can be attained even when the slanted angle of each of the slopes is relatively large close to the vertical direction.

Figure 4:
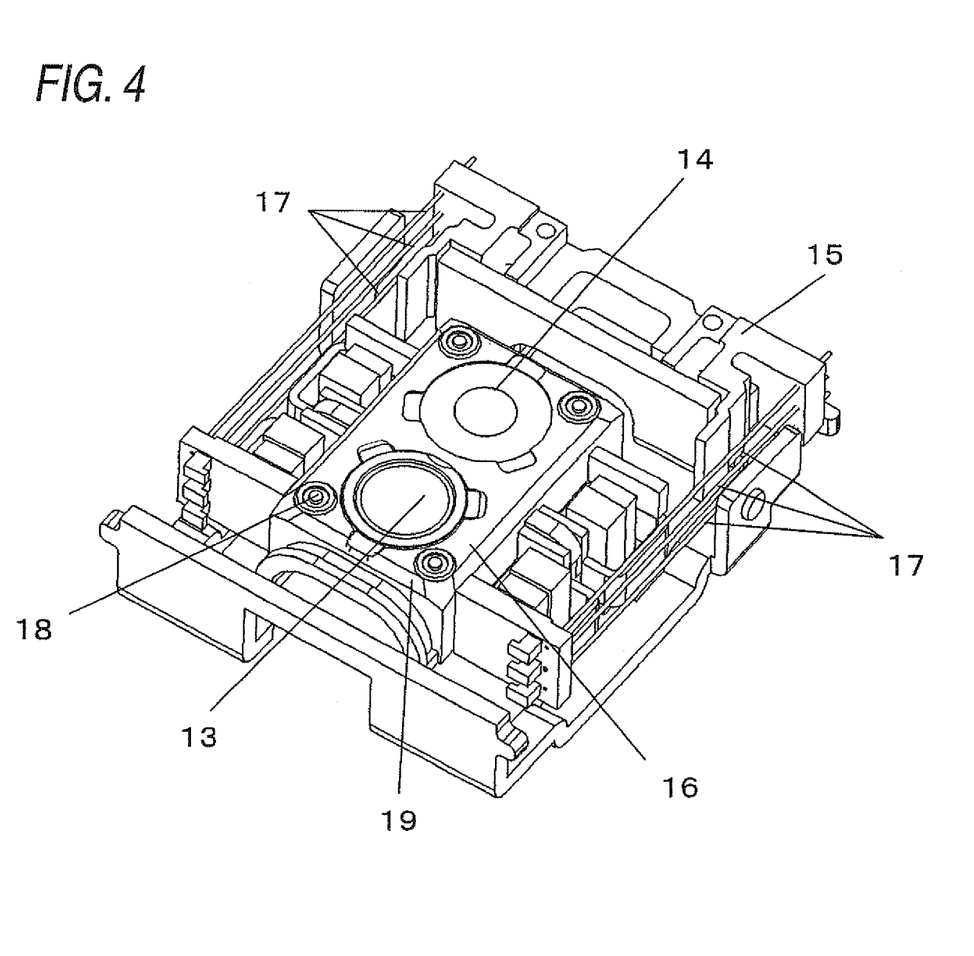
FIG. 4 is a perspective view showing the actuator according to the embodiment of the invention.

Further, the lens protectors 18 and the slopes 19 are provided so as to be symmetrical with respect to the center of gravity of the optical pickup actuator 5. Furthermore, each of the lens protectors 18 is provided with the two slopes 19 in a manner that one of the slopes is provided in the bending direction in parallel to the suspension wires 17 and the other is provided with an angle of almost 55 degree with respect to bending direction. Since the slopes are disposed in this manner, an optical disc contacts with the slopes 19 even when the optical disc is inserted from any direction. The number of the slopes 19 for each of the lens protectors 18 is not limited. That is, it is preferable to increase the number of the slopes in order to prevent the deformation of the suspension wires 17. Alternatively, the aforesaid effects can be enhanced when the slopes 19 are provided on the entirety of the side surface of each of the lens protectors 18 in a pyramidal manner. Further alternatively, the aforesaid effects can be further enhanced when the slopes 19 are formed on the entire periphery of the side surfaces of the lens holder 16 as shown in FIG. 4. This is because although large effects can be obtained when the slopes 19 are provided on the upstream side of the insertion direction of an optical disc in the optical disc driver of a slot loading type, an optical disc may contact to the optical pickup actuator 5 from any direction in the optical disc driver of a tray type.

Although the lens protectors 18 are disposed at four portions in this embodiment, the similar effects can be obtained when a lens protector 18 formed by extending the lens protector 18 in the radial direction and provided with the similar slopes 19 is disposed at two portions. In addition, the lens protector 18 may be disposed at one portion. Further, although the optical pickup actuator 5 according to the embodiment has the two objective lenses 13 and 14, the similar effects can be obtained in a case where the optical pickup actuator 5 is provided with a single objective lens coping with both a long wavelength laser and a short wavelength laser.

Next, the explanation will be made as to why, in the optical disc driver capable of coping with a BD, a part of the movable portion of the optical pickup actuator protrudes from the pickup cover.

Figure 5:
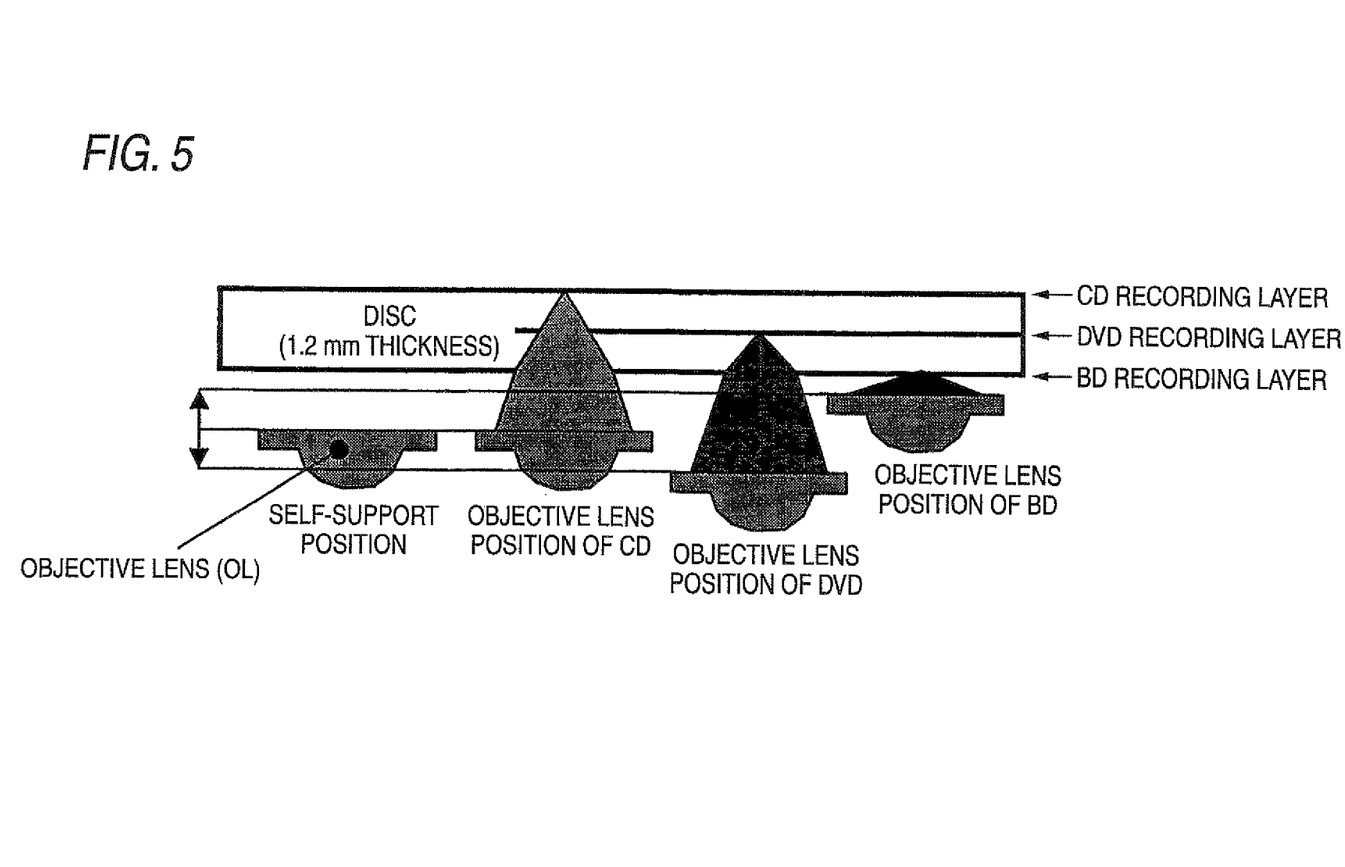
FIG. 5 is a schematic diagram showing distances to an optical disc from the operation positions of the objective lenses in various kinds of optical discs.

FIG. 5 is a schematic diagram showing distances to an optical disc from the operation positions of the objective lenses in the various kinds of optical discs.

The distance to an optical disc from the objective lens at the time of recording or reproducing the various kinds of optical discs differs depending on the kind of the optical disc. The distances become shorter in the order of a DVD, a CD and a BD.

In the optical disc drive of the related art, since only a DVD and a CD are subjected to the recording and reproducing processing, the self-support position of the objective lens is set at an almost intermediate position between the operation position of the objective lens (OL) of a DVD and the operation position of the objective lens (OL) of a CD. Thus, since the optical pickup actuator 5 does not protrude on the optical disc side from the pickup cover 12, there does arise a problem that the optical pickup actuator 5 protrudes. However, in the case of the optical disc driver coping with three kinds of media of a BD, a DVD and a CD, when the self-support position of the objective lens is set at the almost intermediate position between the operation position of the objective lens of a DVD and the operation position of the objective lens of a CD, it requires a large current to drive the optical pickup actuator 5 to the operation position of the objective lens of a BD. In particular, in the optical disc driver of a thin type configured so as to be incorporated within a notebook-size personal computer, since the personal computer may be driven by battery, the increase of an amount of power consumption is not permitted. Further, when the driving power of the optical pickup actuator 5 increases, it is feared that the temperature increases at the time of the driving. When the optical pickup actuator 5 generates heat, since the temperature of the objective lenses 13 and 14 becomes high, the optical aberration of the lenses arises to badly influence on the characteristics of the pickup. Further, when the moving distance to the operation position of the objective lens of a BD becomes long, there may arise a problem that the optical pickup actuator 5 tilts at the time of the operation to thereby cause a phenomenon of inclining the objective lenses 13, 14 from the optical axes or cause a problem in the linearity of the moving distance with respect to the current.

In view of the aforesaid problems, the optical disc driver capable of coping with a BD, a DVD and a CD is configured in a manner that the self-support position thereof is set near the operation position of the objective lens of a CD, whereby the part of the movable portion of the optical pickup actuator is configured to protrude from the pickup cover 12. According to such the configuration, the optical pickup actuator 5 can be driven to the operation positions of the objective lenses of a BD, a DVD and a CD with the minimum current.

Next, the operations will be explained in the case where the end portion of the outer periphery of an optical disc contacts with the optical pickup actuator 5 in the optical pickup actuator of the related art and the optical pickup actuator of the invention.

Figure 6:
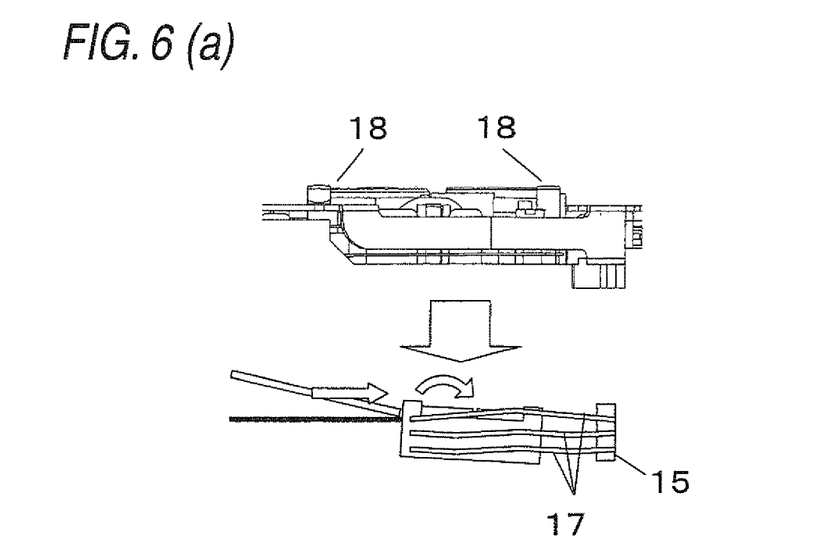

FIG. 6(*a*) is a diagram for explaining the operation in the case where the end portion of the outer periphery of an optical disc contacts with the lens protector, in the optical pickup actuator of the related art. FIG. 6(*b*) is a diagram for explaining the operation in the case where the end portion of the outer periphery of an optical disc contacts with the slope 19 added to the lens protector in this embodiment.

In the optical pickup actuator of the related art configured as shown in FIG. 6(*a*), when an optical disc is inserted so as to slide on the upper surface of the pickup cover 12 particularly like the optical disc driver of a slot loading type, the lens protector 18 contacts with or is caught by the end portion of the outer periphery of an optical disc and is applied with an external force. Since the optical pickup actuator 5 is suspended by the suspension wires 17, there arises a deformation such as a bent or a warp in the suspension wire 17. When the suspension wire deforms, the optical pickup actuator tilts to thereby incline the objective lenses 13, 14 from the optical axes thereof, respectively. As a result, since a laser light can not be correctly converged on the recording surface, there arises a problem that the recording and reproducing characteristics with respect to the optical disc degrades and further the objective lenses 13 and 14 shift from the optical axes thereof, respectively, whereby the recording and reproducing operations may be impossible.

In contrast, in this embodiment as shown in FIG. 6(*b*), an optical disc is inserted so as to slide on the upper surface of the pickup cover 12 in the optical pickup 6 provided with the slopes 19 on the side surface of each of the lens protectors 18. In this case, even when the slope 19 added to the lens protector 18 contacts with the end portion of the outer periphery of an optical disc and is applied with an external force, the contacted portion of the optical disc slides along the slope 19 to push down the optical pickup actuator 5 in the elevational direction, so that the optical pickup actuator 5 moves beneath the pickup cover 12. As a result, since a force is not applied to the suspension wires 17 in the bending direction thereof, the deformation of the suspension wires 17 can be prevented.

Also in the case where an external force is applied to the suspension wires from the left and right direction shifted by 90 degree from the bending direction, the deformation of the suspension wires 17 due to the twist can be prevented by the presence of the slopes 19.

Further, the similar effects also can be attained in the optical disc driver of a tray type as well as the optical disc driver of a slot loading type. This is because an optical disc may contact with the optical pickup actuator 5 from any direction in the optical disc driver of a tray type.

In the optical pickup actuator 5 according to the invention, even when an optical disc is inserted so as to slide on the upper surface of the pickup cover 12, the end portion of the outer periphery of the optical disc contacts with the slope provided at the projection and slides along the slope to thereby push down the optical pickup actuator 5 in the elevational direction. Thus, since there does not arise a force in the bending direction of the suspension wires 17, the deformation of the suspension wires can be prevented.

Further, since the objective lenses 13 and 14 correspond to the long wavelength laser and the short wavelength laser, respectively, the optical pickup actuator can cope with both the long wavelength laser and the short wavelength laser with a simple configuration.

Further, since a plurality of the objective lenses are aligned along the tangential direction of an optical disc and the objective lens 14 corresponding to the short wavelength laser is disposed on the upstream side of the insertion direction of the optical disc, the optical path of the short wavelength laser can be made common to that of the long wavelength laser, so that the optical pickup actuator 5 can be miniaturized.

Further, when the single objective lens is arranged to cope with both the long wavelength laser and the short wavelength laser, the optical pickup actuator 5 can be miniaturized and light-weighted.

Further, since at least one of the slopes 19 is provided so as to be directed along the bending direction of the suspension wires 17 that is in parallel to the extending direction of the suspension wires 17, when an optical disc is inserted along the bending direction of the suspension wires 17, the optical disc can be necessarily made contact with the slope 19.

Further, since the slopes 19 are provided on the entirety of the side surface of each of the lens protectors 18 in a pyramidal manner so as to protrude outwardly, even when an optical disc is inserted so as to slide on the upper surface of the pickup cover 12 from any direction, the optical disc can be made contact with the slope 19.

Further, since the slopes are provided at the end portion of the entirety of the upper surface of the lens holder 16 so as to protrude outwardly, even when an optical disc is inserted so as to slide on the upper surface of the pickup cover 12 from any direction, the optical disc can be made surely contact with the slope 19.

Further, since the lens protectors 18 and the slopes 19 are formed symmetrically with respect to the center of gravity of the optical pickup actuator 5, even when an optical disc is inserted so as to slide on the upper surface of the pickup cover 12 from any direction, the optical disc can be made surely contact with the slope 19.

Further, since the lens protectors 18 are formed at the four corners of the optical pickup actuator 5, even when an optical disc is inserted from any direction, the optical disc contacts with the slope 19 formed at the periphery of the lens protector 18.

Further, since the lens protector 18 formed by extending in the radial direction is disposed at the two portions, even when an optical disc is inserted from any direction, the optical disc contacts with the slope 19 formed at the periphery of the lens protector 18.

In the optical disc driver according to the invention, even when an optical disc is inserted so as to slide on the upper surface of the pickup cover 12, the end portion of the outer periphery of the optical disc contacts with the slope 19 provided at the lens protector 18 and slides along the slope 19 to thereby push down the optical pickup actuator 5 in the elevational direction. Thus, since there does not arise a force in the bending direction of the suspension wires 17, the deformation of the suspension wires 17 can be prevented.

Further, since the slope 19 extends so as to extend from the highest position of the corresponding lens protector 18 to the lower position than the highest position of the pickup cover 12, when an optical disc is inserted so as to slide on the upper surface of the pickup cover 12, the optical disc can be surely made contact with the slope.

Furthermore, when an optical disc is inserted in a manner of contacting with the upper surface of the pickup cover 12, since the end portion of the outer periphery of the optical disc contacts with the slope 19 provided at the lens protector 18 to thereby push down the optical pickup actuator 5 in the elevational direction, there does not arise any force in the bending direction of the suspension wires 17 and hence the deformation of the suspension wires 17 can be prevented.

This application claims the benefit of Japanese Patent application No. 2008-267009 filed on Oct. 16, 2009, the entire contents of which are incorporated herein by reference.

What is claimed is:

1. An optical pickup actuator comprising:
    an objective lens which converges a light on an optical recording medium;
    a lens holder which holds the objective lens;
    a suspension wire which holds the lens holder; and
    projections which are provided at the lens holder;
    wherein the projections are provided at a periphery of the objective lens and at least one of the projections is provided on an upstream side of an insertion direction of the optical recording medium, each of the projections including at least two independent sloped surfaces that are sloped relative to the insertion direction of the optical recording medium and in different directions from each other, and wherein the at least two independent sloped surfaces are sloped in a direction away from the objective lens and configured such that when the optical recording medium contacts one of the at least two independent sloped surfaces at a time of inserting the optical recording medium, the optical recording medium is guided in a direction away from the lens holder and the lens holder is moved in a direction substantially perpendicular to the insertion direction.

2. The optical pickup actuator according to claim 1, wherein a plurality of the objective lenses respectively corresponding to a long wavelength laser and a short wavelength laser are provided.

3. The optical pickup actuator according to claim 2, wherein the plurality of objective lenses are aligned along a tangential direction of the optical recording medium and the objective lens corresponding to the short wavelength laser is disposed on the upstream side of the insertion direction of the optical recording medium.

4. The optical pickup actuator according to claim 1, wherein the objective lens corresponds to both a long wavelength laser and a short wavelength laser.

5. The optical pickup actuator according to claim 1, wherein the sloped surface is provided in parallel to a longitudinal direction of the suspension wire.

6. The optical pickup actuator according to claim 1, wherein the sloped surface is provided on an entirety of a side surface of the projection on which it is provided so as to protrude outward in a pyramidal manner.

7. The optical pickup actuator according to claim 1, wherein the sloped surface is provided on an entirety of a side surface of the projection on which it is provided so as to protrude outward.

8. The optical pickup actuator according to claim 1, wherein the projections and the sloped surface are formed symmetrically with respect to a center of gravity of the optical pickup actuator.

9. The optical pickup actuator according to claim 7, wherein the projections are formed at four corners of the optical pickup actuator.

10. The optical pickup actuator according to claim 7, wherein the projections are formed in a manner that the projections formed by extending in a radial direction is provided at two portions.

11. An optical disc driver comprising:

an optical pickup actuator which includes an objective lens which converges a light on an optical recording medium, a lens holder which holds the objective lens, a suspension wire which holds the lens holder, and projections which are provided at the lens holder, wherein at least one of the projections is provided on an upstream side of an insertion direction of the optical recording medium, the at least one of the projections including at least two independent sloped surfaces that are sloped relative to the insertion direction of the optical recording medium and in different directions from each other; and a pickup cover which protects the optical pickup actuator, wherein:

a part of the optical pickup actuator protrudes from a highest position of the pickup cover, and wherein:

the at least two independent sloped surfaces are sloped in a direction away from the objective lens and configured such that when the optical recording medium contacts one of the at least two independent sloped surfaces at a time of inserting the optical recording medium, the optical recording medium is guided in a direction away from the lens holder and the lens holder is moved in a direction substantially perpendicular to the insertion direction.

12. The optical disc driver according to claim 11, wherein the sloped surface extends from a highest position of the corresponding one of the projections to a lower position than a highest position of the pickup cover.

13. The optical disc driver according to claim 11, wherein when the optical recording medium is inserted while contacting with an upper surface of the pickup cover, an end portion of an outer periphery of the optical recording medium contacts with the sloped surface provided at the projections to thereby push down the optical pickup actuator in an elevational direction.

* * * * *